US009772634B2

(12) United States Patent
Bharadwaj et al.

(10) Patent No.: US 9,772,634 B2
(45) Date of Patent: Sep. 26, 2017

(54) INCUBATOR ASSEMBLY AND ASSOCIATED CONTROL APPARATUS THAT CONTROLS HUMIDITY RATE

(75) Inventors: Sanjay Bharadwaj, Bangalore (IN); Uttama Kumar Sahu, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 434 days.

(21) Appl. No.: 13/977,753

(22) PCT Filed: Dec. 29, 2011

(86) PCT No.: PCT/IB2011/056014
§ 371 (c)(1),
(2), (4) Date: Jul. 1, 2013

(87) PCT Pub. No.: WO2012/093326
PCT Pub. Date: Jul. 12, 2012

(65) Prior Publication Data
US 2013/0289776 A1    Oct. 31, 2013

Related U.S. Application Data

(60) Provisional application No. 61/430,559, filed on Jan. 7, 2011.

(51) Int. Cl.
*G05D 27/00*    (2006.01)
*A61G 11/00*    (2006.01)
(Continued)

(52) U.S. Cl.
CPC ............. *G05D 27/00* (2013.01); *A61G 11/00* (2013.01); *F24F 11/0015* (2013.01); *G05D 22/02* (2013.01); *A61G 2203/46* (2013.01)

(58) Field of Classification Search
None
See application file for complete search history.

(56) References Cited

U.S. PATENT DOCUMENTS 4,105,063 A *  8/1978  Bergt .................. F24F 3/14
                                                165/228
5,316,542 A    5/1994  Koch et al.
(Continued)

FOREIGN PATENT DOCUMENTS

EP    0880957 A2    12/1998
EP    0933075 A2    8/1999
(Continued)

OTHER PUBLICATIONS

Djaaffar Bouattoura et al; "Dynamic Programming Approach for Newborn's Incubator Humidity Control", IEEE Transactions on Biomedical Engineering, vol. 45, No. 1, Jan. 1998, pp. 48-55.
(Continued)

*Primary Examiner* — Mohammad Ali
*Assistant Examiner* — Saad M Kabir

(57) ABSTRACT

An improved incubator and control apparatus include separate temperature and humidity control loops wherein a commanded temperature and a commanded relative humidity (RH) value are commanded to the control apparatus via a user interface. The control apparatus employs a humidifier rate saturation controller which acts responsive to both a humidity control signal and a current temperature to regulate the addition of humidity to the air within the incubator assembly to avoid a transient humidity from exceeding a predetermined value and thereby avoiding the generation of condensation within the incubator.

8 Claims, 5 Drawing Sheets

(51) Int. Cl.
*F24F 11/00* (2006.01)
*G05D 22/02* (2006.01)

(56) References Cited

U.S. PATENT DOCUMENTS

| | | |
|---|---|---|
| 5,415,618 A | 5/1995 | Koch |
| 5,853,361 A | 12/1998 | Kobayashi et al. |
| 5,897,485 A | 4/1999 | Koch |
| 5,984,002 A * | 11/1999 | Kido ................. F24F 11/0008 165/224 |
| 6,048,304 A | 4/2000 | Koch |
| 6,443,885 B1 | 9/2002 | Schuler |
| 6,711,937 B2 | 3/2004 | Richards et al. |
| 7,442,163 B2 | 10/2008 | Ten Eyck et al. |
| 2002/0143232 A1 | 10/2002 | Richards et al. |
| 2003/0197003 A1 | 10/2003 | Kneuer |
| 2004/0267087 A1 | 12/2004 | Ogata |
| 2006/0199134 A1* | 9/2006 | Ness ................. B03B 4/06 432/121 |
| 2007/0149843 A1* | 6/2007 | Ten Eyck ............. A61G 11/00 600/22 |
| 2009/0149927 A1 | 6/2009 | Kneuer et al. |

FOREIGN PATENT DOCUMENTS

| | | |
|---|---|---|
| EP | 1593946 A1 | 11/2005 |
| EP | 1800641 A2 | 6/2007 |
| GB | 2316617 A | 3/1998 |
| GB | 2346560 A | 8/2000 |
| WO | 0263406 A2 | 8/2002 |

OTHER PUBLICATIONS

Carlos Paternain Soler et al; "Prototyping a Closed Loop Control System for a Neonatal Incubator", Helmholtz-Institute for Biomedical Engineering, AACHEN, Nov. 28, 2009, pp. 1-89.

* cited by examiner

INCUBATOR ASSEMBLY AND ASSOCIATED CONTROL APPARATUS THAT CONTROLS HUMIDITY RATE

The present invention pertains to infant incubator equipment and, in particular, to an infant incubator assembly and an associated control apparatus that controls air humidity by controlling humidity rate.

Incubators such as those used for infants and other patients are generally known in the relevant art. Such incubators often possess an enclosed interior within which a patient is disposed and within which is maintained a controlled environment. More particularly, at least the temperature and humidity of the air within the incubator typically are controlled by an appropriate control system.

It is noted that the ability of a newborn infant to maintain and regulate its body temperature is key for survival and growth. Infants who are born prematurely or at a relatively low birth weight or who require medical procedures that necessitate the infant to remain unclothed typically struggle to maintain an appropriate body temperature. Calories are expended for such effort, and calories that are expended in maintaining an infant's body temperature cannot be used for an infant's weight gain. As such, an infant's weight gain can be impeded unless an appropriate environment is maintained around the infant, with such an environment typically being controlled both in terms of temperature and humidity.

It is well known that servo feedback control mechanisms can be employed to shape transient and steady state responses to temperature and humidity commands. Infant incubators that employ such controls typically include sensors for temperature and relative humidity (RH), control architecture components, and an air heater and a humidifier to close the control loop. The control architecture components typically employ algorithms that are implemented as software that is embedded as logic on microcontroller integrated circuits that determine the values at which to drive the heater and humidifier in response to commanded values for temperature and humidity as well as sensed temperature and humidity.

It is also well understood that relative humidity (RH) is a temperature-dependent value. For instance, if the temperature of a volume of air is increased with no change in its moisture content, the air's relative humidity (RH) will decrease. The inter-dependent relationship between temperature and relative humidity typically complicates the control architecture employed in an infant incubator, and it thus has been known to use sophisticated multi-variable controller synthesis methodologies that are described in academic literature. The implementation of such methodologies has typically been hampered by (a) modeling difficulties due to the presence of elements whose transient dynamics are difficult to capture and characterize; (b) hesitation to implement controllers with complicated structures due to their non-intuitive behavior and consequent difficult operational procedures; and (c) difficulties in tuning the parameters of such controllers.

Actual applications in the relevant industry therefore have tended toward the use of simpler control architectures such as those employing Proportional, Integral, and Derivative (PID) control systems. However, the design and implementation of servo control systems that employ independent PID control loops for variables that are dependent upon one another, such as temperature and relative humidity (RH), typically further require corrections that employ lookup tables that are either ad hoc in nature or are empirically decided. Such systems have met with limited success and have typically required heaters and humidifiers having higher capacities than perhaps is empirically necessarily in order to achieve desired performance. Further difficulty has been encountered in attempting to implement additional logic to compensate for opened ports, doors, walls, etc. Still further difficulty has been encountered since heaters and humidifiers typically are separate components having separate transient response characteristics which, due to the interdependence of temperature and humidity, can compete with one another and can result in overshoots of one parameters and/or the other. It thus would be desirable to provide an improved incubator assembly and control apparatus that overcome these and other needs.

An improved incubator and control apparatus include separate temperature and humidity control loops wherein a commanded temperature and a commanded relative humidity (RH) value are commanded to the control apparatus via a user interface. The humidity control loop employs specific humidity (SH) in its control operations. The use of SH rather than RH decouples humidity from temperature and thus simplifies control of both. The control apparatus employs a humidifier rate saturation controller which acts responsive to both a humidity control signal and a current temperature to regulate the addition of humidity to the air within the incubator assembly to avoid a transient humidity from exceeding a predetermined value and thereby avoiding the generation of condensation within the incubator.

Accordingly, an aspect of the present invention is to provide an improved incubator assembly.

Another aspect of the present invention is to provide an improved control apparatus for an incubator assembly.

Another aspect of the present invention is to provide an improved incubator assembly and control apparatus that provide improved control of temperature and humidity.

Another aspect of the present invention is to provide an improved incubator assembly and control apparatus wherein the control of temperature and humidity are decoupled from one another due to the use of specific humidity in a humidity control loop.

Another aspect of the present invention is to provide an improved incubator assembly and control apparatus wherein the transient humidity within an interior of the incubator assembly can be regulated to avoid the transient humidity from exceeding a predetermined value, which reduces the likelihood of the formation of condensation within the interior.

These and other aspects of the present invention are provided by an improved control apparatus that is structured to enable control of an environment within an interior of an incubator assembly. The general nature of the control apparatus can be stated as including a processor apparatus upon which are executed a number of routines that comprise a user interface routine which enables the setting of a commanded temperature value and a commanded relative humidity value. The general nature of the control apparatus can be stated as further including a temperature control loop comprising a temperature sensor and a temperature controller, the temperature sensor being structured to sense a current temperature, the temperature controller being structured to generate a temperature control signal based at least in part upon the commanded temperature value and the current temperature. The general nature of the control apparatus can be stated as additionally including a humidity control loop comprising a relative humidity sensor, a specific humidity converter, and a humidity controller, the relative humidity sensor being structured to sense a current relative humidity, the specific humidity converter being structured to generate a current specific humidity based at least in part upon the current relative humidity and to generate a commanded specific humidity value based at least in part upon the commanded relative humidity value, the humidity controller being structured to generate a humidity control signal based at least in part upon the commanded specific humidity value and the current specific humidity.

Other aspects of the present invention are provided by an improved control apparatus that is structured to enable control of an environment within an interior of an incubator assembly. The general nature of the control apparatus can be stated as including a processor apparatus upon which are executed a number of routines that comprise a user interface routine which enables the setting of a commanded temperature value and a commanded humidity value. The general nature of the control apparatus can be stated as additionally including a temperature control loop comprising a temperature sensor and a temperature controller, the temperature sensor being structured to sense a current temperature, the temperature controller being structured to generate a temperature control signal based at least in part upon the commanded temperature value and the current temperature. The general nature of the control apparatus can be stated as additionally including a humidity control loop comprising a humidity sensor, a humidity controller, and a humidifier rate saturation controller, the humidity sensor being structured to sense a current humidity, the humidity controller being structured to generate a humidity control signal based at least in part upon the current humidity and the commanded humidity value, the humidifier rate saturation controller being structured to generate a humidity rate control signal based at least in part upon the humidity control signal and at least one of the current temperature and the commanded temperature value.

Other aspects of the present invention are provided by an improved method of controlling an environment within an interior of an incubator assembly based at least in part upon a commanded temperature value and a commanded relative humidity value, the incubator assembly being of a type that includes a heater and a humidifier. The general nature of the method can be stated as including sensing a current temperature within the interior, generating a temperature control signal based at least in part upon the commanded temperature value and the current temperature, and operating the heater based at least in part upon the temperature control signal. The general nature of the method can be stated as further including sensing a current relative humidity within the interior, generating a current specific humidity based at least in part upon the current relative humidity, generating a commanded specific humidity value based at least in part upon the commanded relative humidity value, generating a humidity control signal based at least in part upon the commanded specific humidity value and the current specific humidity, and operating the humidifier based at least in part upon the humidity control signal.

Other aspects of the present invention are provided by an improved method of controlling an environment within an interior of an incubator assembly based at least in part upon a commanded temperature value and a commanded humidity value, the incubator assembly being of a type that includes a heater and a humidifier. The general nature of the method can be stated as including sensing a current temperature within the interior, generating a temperature control signal based at least in part upon the commanded temperature value and the current temperature, and operating the heater based at least in part upon the temperature control signal. The general nature of the method can be stated as further including sensing a current humidity within the interior, generating a humidity control signal based at least in part upon the commanded humidity value and the current humidity, generating a humidity rate control signal based at least in part upon the humidity control signal and at least one of the current temperature and the commanded temperature value, and operating the humidifier based at least in part upon the humidity control signal.

A further understanding of the present invention can be gained from the following Detailed Description of Exemplary Embodiments when read in conjunction with the accompanying drawings in which.

Similar numerals refer to similar parts throughout the specification.

Figure 1:
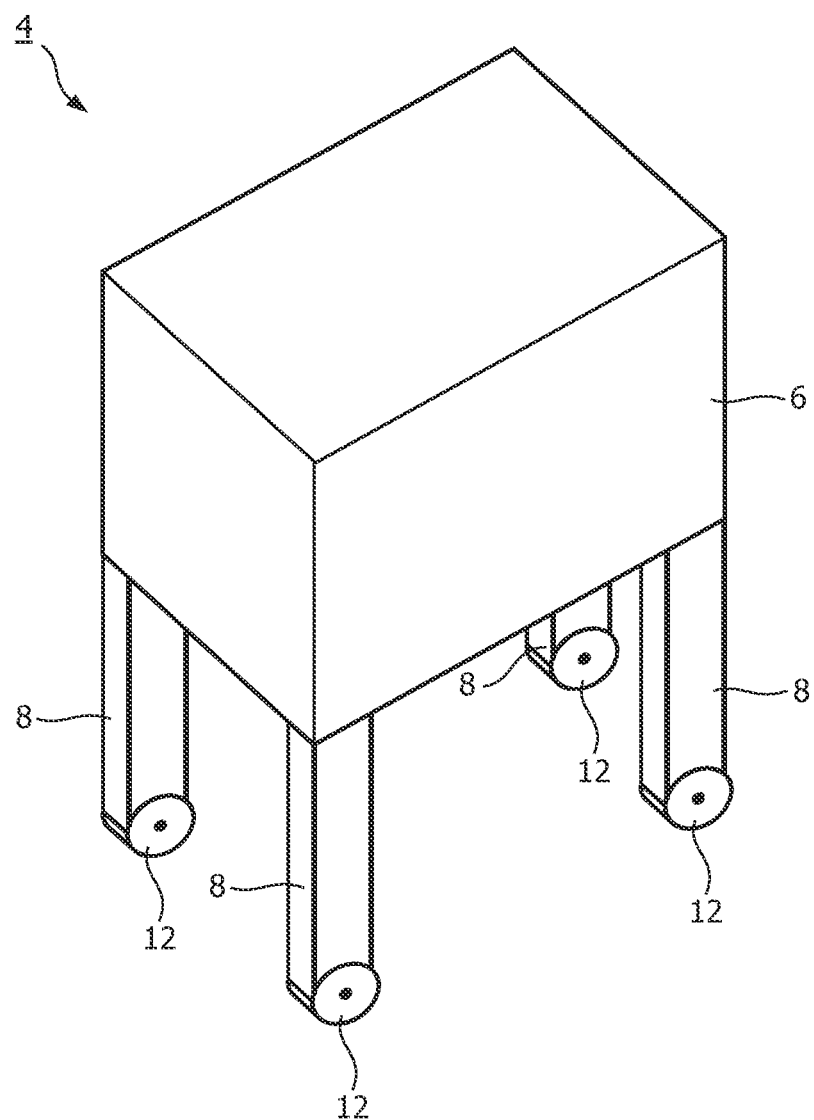
FIG. 1 is a perspective view of an exemplary incubator assembly in accordance with the present invention.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 illustrates an exemplary embodiment of an improved incubator assembly 4 according to the principles of the present invention. Incubator assembly 4 is depicted as comprising an enclosure 6 that is disposed on a plurality of legs 8, with each leg 8 being situated upon a rollable caster 12. It is understood that the exemplary depiction in FIG. 1 is intended to illustrate a typical environment of incubator assembly 4 and is not intended to be limiting in any fashion whatsoever.

Figure 2:
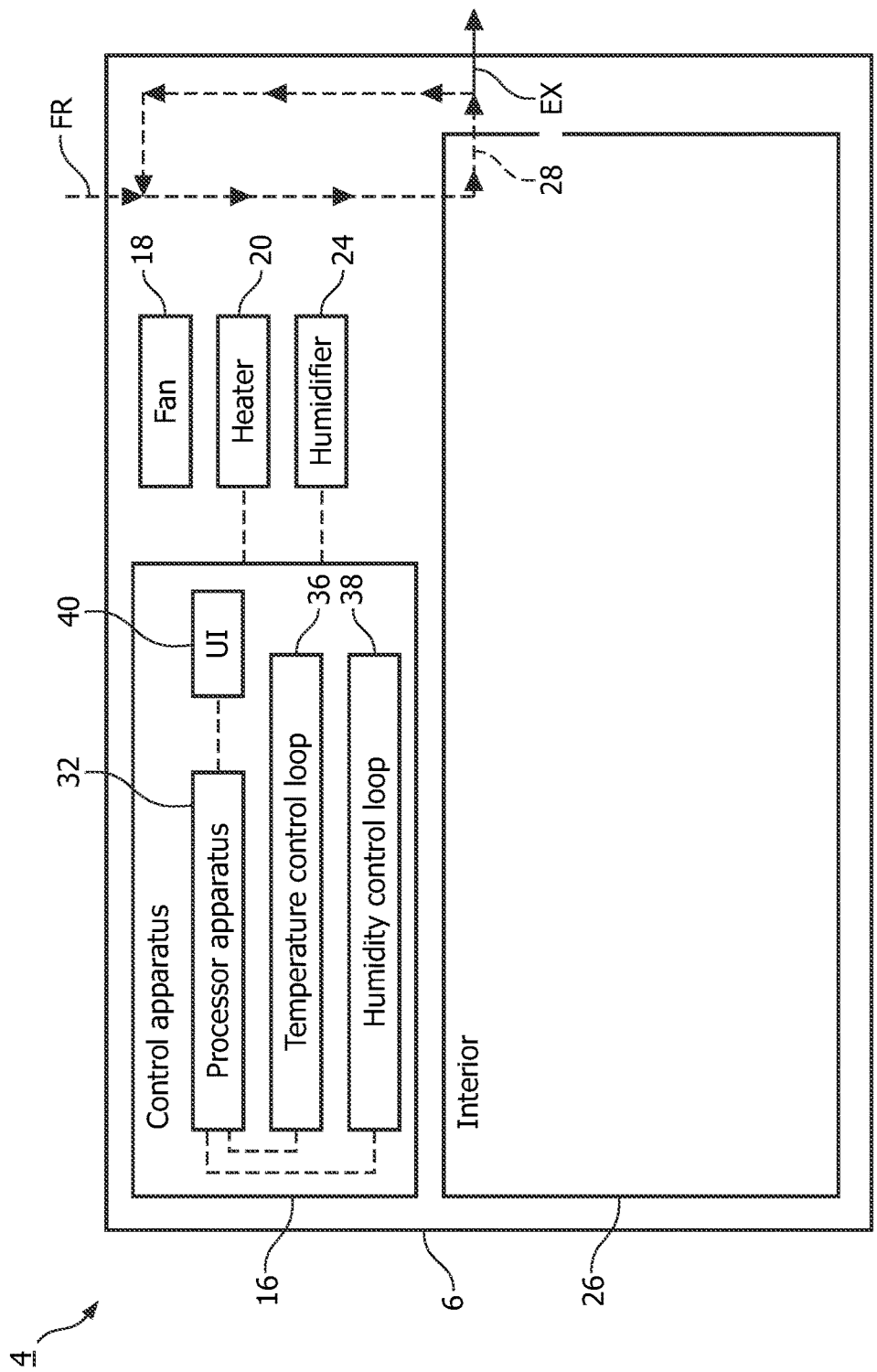
FIG. 2 is a schematic depiction of the incubator assembly of FIG. 1.

As can be understood from FIG. 2, incubator assembly 4 can be described as comprising a control apparatus 16, a fan 18, a heater 20, and a humidifier 24. Enclosure 6 is formed to include an interior 26, and the temperature and humidity of the air or other gas or mixture of gases within interior 26 is controlled by control apparatus 16. FIG. 2 also schematically depicts a flow indicator at the numeral 28 which represents the flow of air past fan 16, heater 20, and humidifier 24, and into interior 26, after which at least a portion of the air is recirculated past fan 16, heater 20, and humidifier 24, and into interior 26, etc. In this regard, it is understood that typically only a portion of the air within interior 26 is recirculated, it being understood that a certain proportion of fresh air indicated at the numeral FR is received into incubator assembly 4 for communication past fan 18, heater 20, and humidifier 24, into interior 26.

As can be further seen from FIG. 2, control apparatus 16 is depicted as directly controlling heater 20 and humidifier 24, and in this regard it is understood that fan 18 typically is configured to operate at a fixed speed that is not actively manipulated. In other embodiments, however, the speed of fan 18 potentially could be controlled without departing from the present concept.

It can further be seen from FIG. 2 that control apparatus 16 comprises a processor apparatus 32, a temperature control loop 36, and a humidity control loop 38. Processor apparatus 32 controls and/or is in communication with temperature control loop 36 and humidity control loop 38. In this regard, it is understood that processor apparatus 32 performs certain processing operations which, depending upon the implementation, potentially can be performed directly in temperature control loop 36 or humidity control loop 38, or both, and it is thus understood that the exemplary embodiment of control apparatus 16 that is depicted herein is not intended to be limiting and rather is intended to encompass other embodiments in which various control and processing operations may be carried out other than directly on processor apparatus 36.

As can be further understood from FIG. 2, control apparatus 16 further comprises a user interface 40 which, in the exemplary embodiment depicted herein, is in the form of a routine that is executable on processor apparatus 32. By way of example, user interface 40 enables a user such as a nurse, a technician, etc. to communicate with processor apparatus 32 and thus with control apparatus 16 to enable the user to control and otherwise operate incubator assembly 4. For instance, user interface 40 would enable the user to set a commanded temperature value (Tset) 44 and a commanded relative humidity value (RHset) 46, and potentially can enable the user to set other parameters and input other commands as appropriate to operate incubator assembly 4. In this regard, user interface 40 might include or cooperate with an electronic display that would enable visual or other output to be provided to the user, and may further include an input device such as a keypad or a touch-sensitive component of a display that would enable the user to provide input to user interface 40.

It is understood that other components are provided on incubator assembly 4 in the form of other routines that are executable on processor apparatus 32 of control apparatus 16. By way of example, a feed forward lookup 48 is depicted in both FIGS. 4 and 5 and is shown in FIG. 5 as being in the nature of a routine that is executed on processor apparatus 32. Other routines are depicted in FIG. 5 as being executed on processor apparatus 32 and are described in greater detail elsewhere herein. It is understood, however, that the various routines and other elements that are depicted in FIG. 5 as being executed on processor apparatus 32 can be implemented in other forms and thus can be executed or otherwise provided by separate components and/or can be provided in a distributed fashion upon other functional elements described herein without departing from the present concept.

Figure 3:
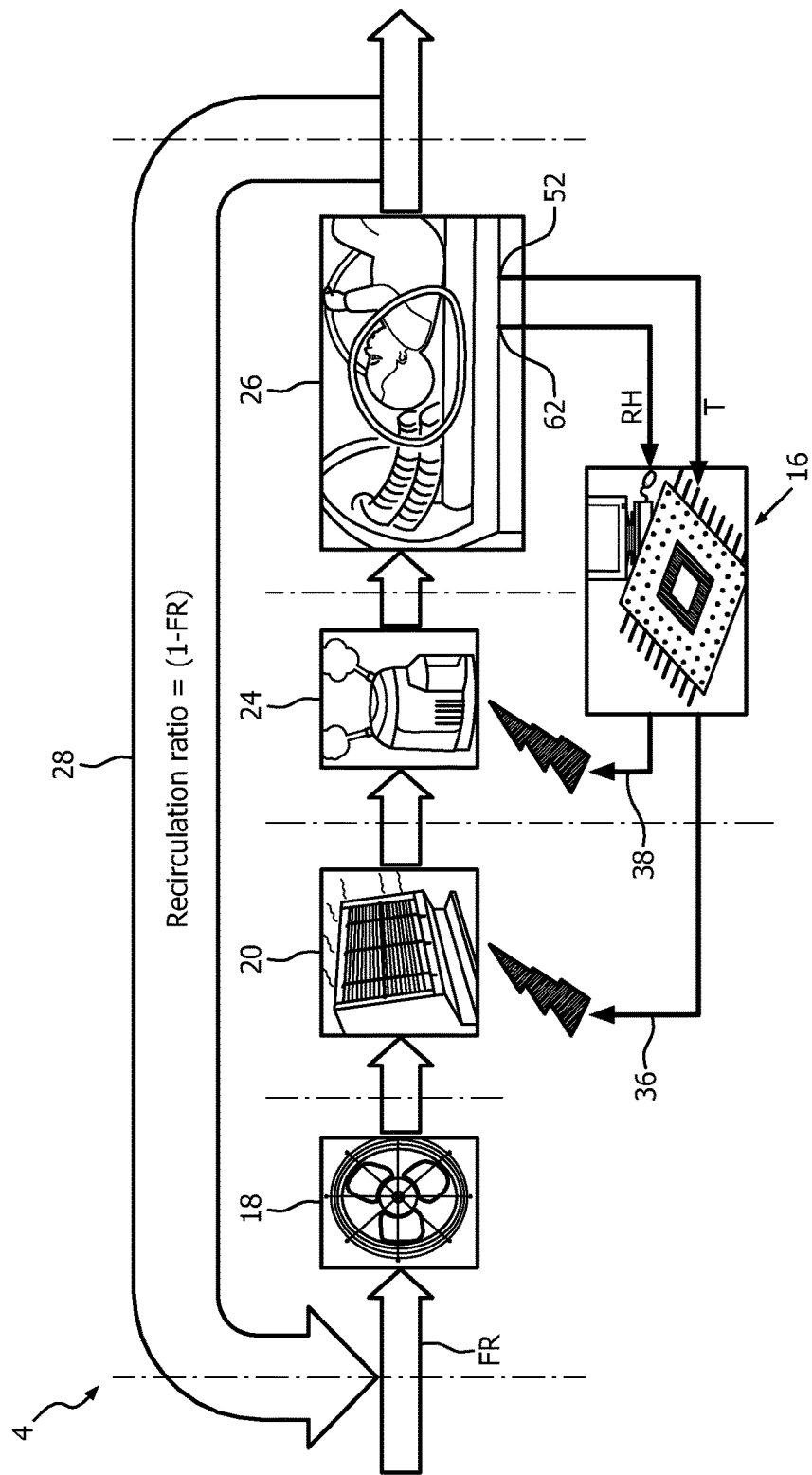
FIG. 3 is a diagrammatic view of the incubator assembly of FIG. 1.

FIG. 3 diagrammatically depicts the flow of air in incubator assembly 4 as well as the control of incubator assembly 4. Air flows past fan 18 to heater 20, and thereafter to humidifier 24 and interior 26, in that order. A portion of the air is then recirculated back to fan 18 and is supplemented by a fresh air intake as is indicated at the numeral FR. A certain portion of the air within interior 26 is thus exhausted to the exterior of incubator assembly 4, as is indicated at the numeral EX (as shown in FIG. 2). It thus can be understood that a recirculation ratio would be equal to (1−FR) and that FR is roughly equal to EX.

The diagrammatic depiction of control apparatus 16 in FIG. 3 demonstrates that temperature (T) and relative humidity (RH) are sensed in interior 26 of incubator assembly 4 and are employed to drive inputs to the actuators of heater 20 and humidifier 24. As mentioned elsewhere herein, inputs to the actuator of humidifier 24 can advantageously be based upon specific humidity (SH) rather than relative humidity (RH), which effectively decouples the control of humidity from the control of temperature since it is understood that specific humidity (SH) is independent of temperature.

If the relative humidity of the air, the density of the water vapor, and the density of the humid air within interior 26 are known, the specific humidity within interior 26 can be expressed as:

$$SH = 0.622 \cdot RH \cdot \rho ws / (\rho - \rho ws) \cdot 100\%$$

where
SH=specific humidity of air vapor mixture (kg/kg)
RH=relative humidity (%)
ρ=density of the humid air (kg/m3)
pws=density of water vapor (kg/m3)

The density of humid air ρ may be calculated as a mixture of ideal gases. The partial pressure of water vapor is known as the vapor pressure. The density of humid air ρ is found by:

$$\rho = Pd/(Rd \cdot T) + Pv/(Rv \cdot T)$$

where:
Pd=Partial pressure of dry air (Pa)
Rd=Specific gas constant for dry air, 287.058 J/(kg·K)
T=Temperature (K)
Pv=Pressure of water vapor (Pa)
Rv=Specific gas constant for water vapor, 461.495 J/(kg·K)

It is known that:

$$Pd = P - Pv$$

where:
P is simply the absolute pressure observed in the system.

The vapor pressure of water may be calculated from the saturation vapor pressure and relative humidity. It is found by:

$$Pv = RH \cdot Psat$$

where:
Pv=Vapor pressure of water
RH=Relative humidity
Psat=Saturation vapor pressure The density of water vapor can be expressed as:

$$pws = 0.0022 Pw/T$$

where:
pws=density water vapor (kg/m3)
Pw=partial pressure water vapor (Pa, N/m2)
T=absolute dry bulb temperature (K)

It thus can be seen that the conversion between RH and SH can be accomplished with typical electronic components including those expressly set forth herein.

Figure 4:
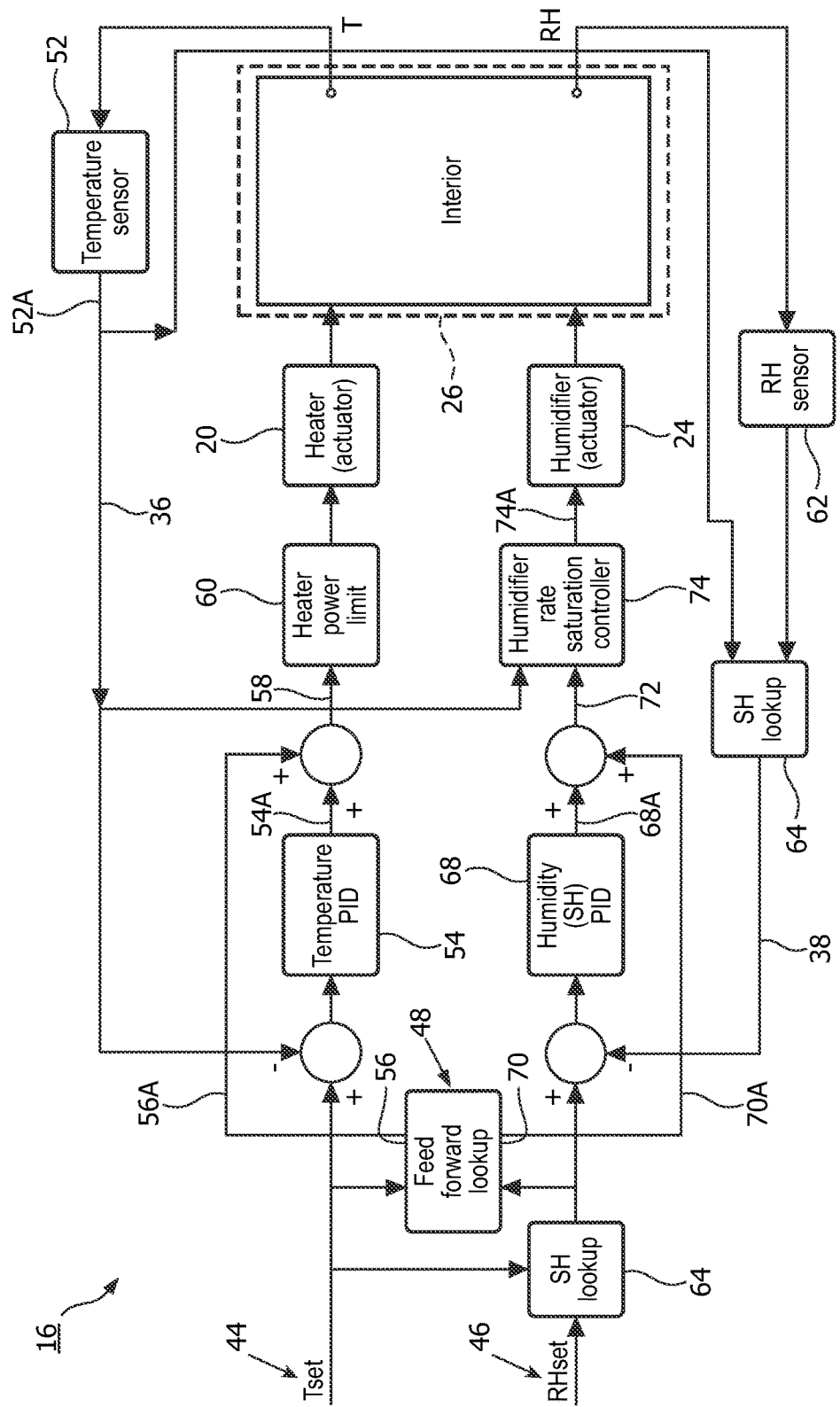
FIG. 4 is a control process diagram of a control apparatus of the incubator assembly of FIG. 1.
Figure 5:
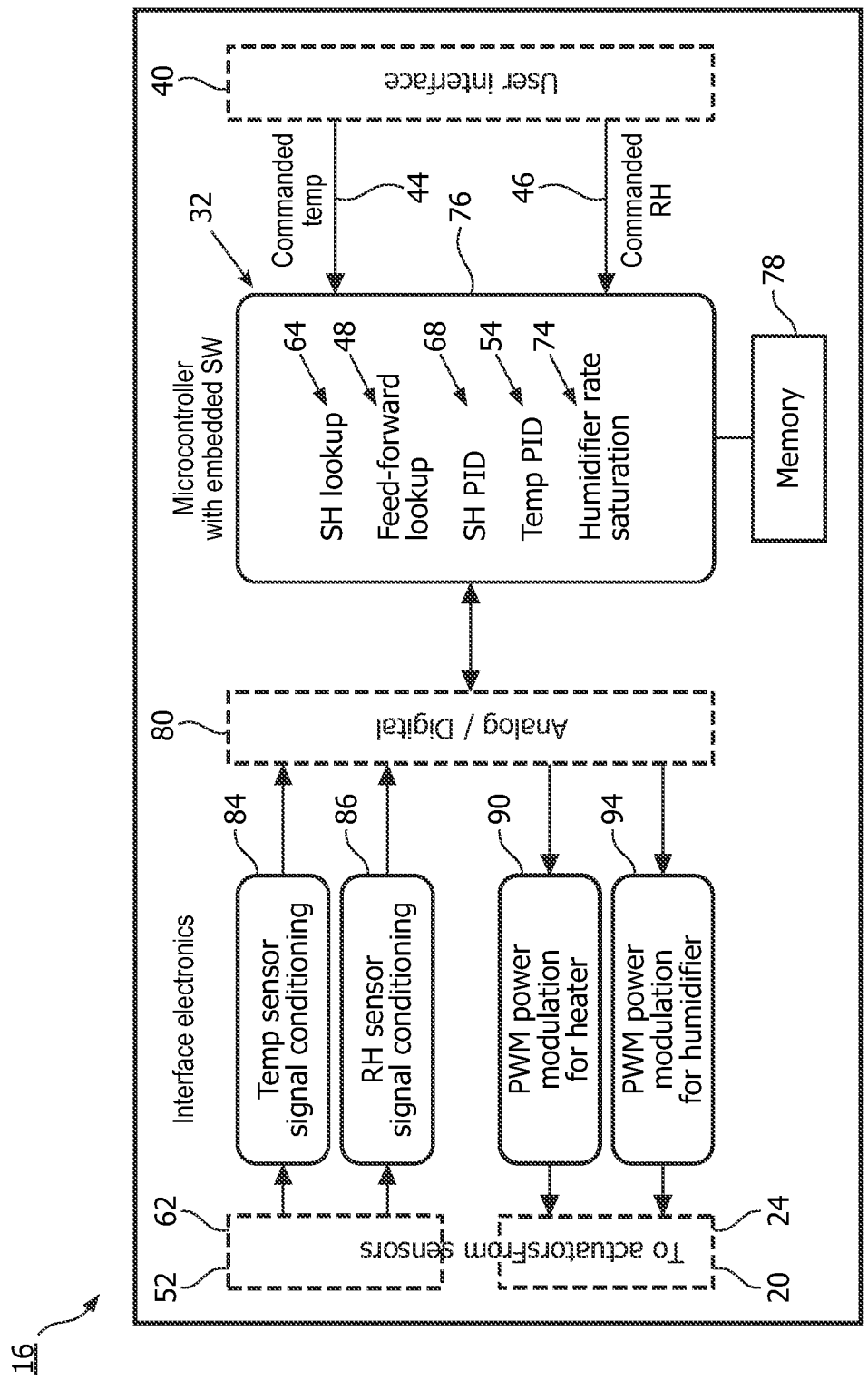
FIG. 5 is a diagrammatic view of the control apparatus of FIG. 4.

A process diagram that is illustrative of the operations of control apparatus 16 is depicted generally in FIG. 4. It can be seen that interior 26 is depicted in FIG. 4 in dashed lines to indicate its relationship with control apparatus 16, although it is understood that interior 26 is not actually intended to be depicted as being a component of control apparatus 16.

As can be understood from FIG. 4, temperature control loop 36 comprises a temperature sensor 52 and a temperature controller 54 which, in the exemplary embodiment depicted herein, is a PID controller, and temperature controller 54 can thus also be referred to herein as being a temperature PID 54. Temperature sensor 52 is structured to depict a current temperature (T) within interior 26 and to responsively communicate a current temperature signal 52A for use by other components of control apparatus 16. In this regard, it is understood that various measurements and values that are detected or determined typically will be communicated within control apparatus 16 as signals, but it is also understood that a reference herein to a measurement or a value with or without the use of the expression "signal" is not intended to be limiting, and it is expressly noted that the expression "signal" is employed herein merely for the sake of convenience, simplicity, and illustration, and such use or non-use is not intended to be limiting in any fashion whatsoever.

In the exemplary embodiment described herein, temperature sensor 52 is a negative temperature coefficient (NTC) thermistor, meaning that its resistance decreases with increasing temperature. In particular, voltage is applied to temperature sensor 52 and is measured across this sensor. Such a voltage can be generated either by a current source or voltage source. The measured voltage will typically vary nonlinearly with temperature variation. Other temperature sensors can be employed without departing from the present concept.

As can also be understood from FIG. 4, temperature controller 54 generates a temperature control signal 54A based at least in part upon commanded temperature value 44 and current temperature signal 52A. An actuator of heater 20 can be said to act, at least in part, upon temperature signal 54A in controlling the temperature of the air which flows into interior 26.

Temperature control loop 36 can further be said to comprise a feed forward temperature lookup component 56 which is a component of feed forward lookup 48. It is reiterated that in the exemplary embodiment depicted herein, feed forward lookup 48 is a routine that is executed on processor apparatus 32. As such, feed forward lookup component 56 employs algorithms or a lookup table, by way of example, to generate a feed forward operational heating value that is communicated as a feed forward operational heating value signal 56A to other portions of control apparatus 16. Feed forward operational heating value can be characterized as the nominal power at which heater 20 needs to be driven in order for the air within interior 26 to be heated to commanded temperature value 44 in view of commanded relative humidity value 46.

Temperature control loop 36 generates from temperature control signal 54A and feed forward operational heating value signal 56A a controlled heater operation signal 58. An actuator of heater 20 can be said to act, at least in part, upon controlled heater operation signal 58 in controlling the temperature of the air which flows into interior 26.

The depicted exemplary embodiment of temperature control loop 36 can be said to further comprise a heater power limit 60 which, in the exemplary embodiment of heater 20 depicted herein, is in the nature of a positive temperature coefficient heating element of heater 20 that increases its electrical resistance with temperature and thus is at least somewhat self-limiting. Heater power limit 60 is depicted in FIG. 4 as being separate from heater 20 merely for purposes of simplicity and is not intended to be limiting. Rather, it is understood in the exemplary depicted embodiment to be a part of heater 20. In some embodiments, temperature control loop 36 can also be said to include heater 20, although this need not necessarily be the case.

As can be understood from FIG. 4, humidity control loop 38 can be said to comprise a relative humidity sensor 62, a specific humidity converter/lookup 64, and a humidity controller 68 which, in the exemplary embodiment depicted herein, is in the form of a PID controller. As such, humidity controller 68 can also be referred to herein as humidity PID 68.

In the exemplary embodiment described herein, relative humidity sensor 62 is a laser trimmed, thermoset polymer capacitive sensing element with on-chip integrated signal conditioning. It generates an output voltage that is almost linear with variation in humidity. It is noted that other types of humidity sensors can be employed without departing from the present concept. For instance, any type of hygrometer instruments can be used for measuring relative humidity within interior 26. A simple form of a hygrometer is known as a psychrometer and consists of two thermometers, one of which includes a dry bulb and the other of which includes a wet bulb. However, electronic devices such as would include the aforementioned laser trimmed capacitive sensing element with on-chip integrated signal conditioning, use temperature of condensation, changes in electrical resistance, and/or changes in electrical capacitance to measure humidity changes.

Relative humidity sensor 62 detects a current relative humidity within interior 26 and communicates a corresponding current relative humidity signal 62A to specific humidity converter/lookup 64. As can be understood from FIG. 5, specific humidity converter/lookup 64 is implemented as a routine that is executable on processor apparatus 32 and employs algorithms and/or lookup tables to convert current relative humidity (RH) signals 62A and current temperature signal 52A into a current specific humidity (SH) signal 64A. It is noted that FIG. 4 depicts specific humidity converter/lookup 64 as being two separate components. That is, in addition to the operations of specific humidity converter/lookup 64 set forth immediately above, it is noted that specific humidity converter/lookup 64 is separately depicted in FIG. 4 as additionally receiving commanded relative humidity value 46 and likewise converting it in conjunction with commanded temperature value 44 into a commanded specific humidity (SH) value that is communicated as a commanded specific humidity (SH) value signal 64B. While specific humidity converter 64 is depicted in FIG. 4 as being two separate components, i.e., one of which converts current relative humidity into current specific humidity and another which converts commanded relative humidity into commanded specific humidity, it is understood that both functions can be provided by a single routine that is executed on processor apparatus 32 without departing from the present concept.

As can be further understood from FIG. 4, humidity controller 68 generates a humidity control signal 68A that is based at least in part upon current specific humidity signal 64A and commanded specific humidity value 64B. In the exemplary implementation depicted generally in FIG. 4, therefore, humidity control signal 68A is in the nature of a specific humidity (SH) control signal.

Humidity control loop 38 can further be said to comprise a feed forward humidity lookup component 70 of feed forward lookup 48. Feed forward humidity lookup component 70 employs algorithms and/or lookup tables to generate from commanded temperature value 44 and commanded relative humidity value 46 a feed forward operational humidifying value 70A. As can be generally understood, feed forward operational humidifying value 70A is communicated as a signal and is representative of the nominal power or percentage of duty cycle that is needed for humidifier 24 to maintain air within interior 26 at commanded relative humidity value 46 when the air is at commanded temperature value 44.

Humidity control loop 38 can be said to generate a controlled humidifier operation signal 72 that is based at least in part upon humidity control signal 68A and feed forward operational humidifying value 70A. Controlled humidifier operation signal 72 can be provided directly to an actuator of humidifier 24, although in the embodiment depicted in FIG. 4, controlled humidifier operation signal 72 is instead communicated to an intermediate controller that regulates the amount of humidity that is added to the air in interior 26 depending upon a current temperature or, potentially, a commanded temperature value.

More particularly, humidity control loop 38 can further be said to comprise a humidifier rate saturation controller 74 that regulates the transient addition of humidity to air to avoid the formation of condensation within interior 26. That is, heater 26 typically has a greater transient lag time than humidifier 24. If humidity is added to the air within interior 26 without consideration of the temperature within interior 26, a potential exists that condensation may form within interior 26. For instance, if the relative humidity within interior 26 reaches 100%, the dew point of the atmosphere inside interior 26 will have been reached, and water vapor will begin to condense within interior 26, which is undesirable. Humidifier rate saturation controller 74 thus generates a humidity rate control signal 74A that is based at least in part upon current temperature signal 52A and controlled humidifier operation signal 72, although it is understood that in other implementations commanded temperature value 44 potentially may be employed in place of current temperature signal 52A without departing from the present concept.

It thus can be seen that by configuring humidity control loop 38 to operate based upon specific humidity (SH) rather than relative humidity (RH), the operation of controlling the humidity of the air within interior 26 can be effectively decoupled from the operation of controlling the temperature of the air within interior 26. That is, since SH is independent of temperature, an increase or decrease in SH within interior 26 does not itself affect the temperature of the air within interior 26. It is reiterated, however, that it is relative humidity (RH) that is the commanded humidity value, as with commanded relative humidity value 46, and RH is likewise the measured parameter that is detected by relative humidity sensor 62. However, by employing specific humidity converter/lookup 64 to convert the commanded and current relative humidity values into corresponding commanded and current specific humidity values, temperature and humidity can each be separately controlled within interior 26 without one affecting the other.

Humidifier rate saturation controller 74 is advantageously provided in the embodiment depicted generally in FIG. 4 in order to overcome possible shortcomings in the operational lag of heater 20. Since humidifier 24 has a potential to add humidity to the air within interior 26 before the temperature of the air has been sufficiently increased by heater 20, humidifier rate saturation controller 74 advantageously relies upon a temperature signal, which is current temperature signal 52A in the exemplary embodiment depicted generally in FIG. 4, to generate humidity rate control signal 74A which restricts the operation of humidifier 24 to avoid the relative humidity in interior 26 from exceeding a predetermined value. Such a predetermined value potentially might be, by way of example, in the range of about 90%-95% relative humidity, although other values can be employed without departing from the present concept.

More specifically, it is reiterated that controlled humidifier operation signal 72 is in the nature of a specific humidity (SH) signal, whereas condensation can begin to form within interior 26 if the relative humidity (RH) increases to the extent that the dew point is reached within interior 26. Since incubator assembly 4 operates to control humidity based upon SH, the transient effect on RH is advantageously considered whenever SH is being increased within interior 26. As such, humidifier rate saturation controller 74 is provided in order to regulate the addition of humidity to avoid the reaching of the dew point.

Humidifier rate saturation controller 74 thus employs current temperature signal 52A and controlled humidifier operation signal 72 which, as mentioned above is an SH signal, and converts these two signals into a corresponding relative humidity value using the formulas and methodology set forth above. If the temperature within interior 26 is such that the corresponding RH would exceed a predetermined value such as 90%-95% relative humidity as suggested above, humidifier rate saturation controller 74 limits the addition of humidity to interior 26. That is, humidifier rate saturation controller 74 employs the predetermined ceiling value of RH, such as 95% RH, and calculates from it and the current temperature an adjusted SH that is less than the SH represented by controlled humidifier operation signal 72. The adjusted SH is then provided to the actuator of humidifier 24 as humidity rate control signal 74A. Humidity is thereby added to interior 26 without the formation of condensation.

As the temperature and humidity within interior 26 change, humidifier rate saturation controller 74 continues to calculate from controlled humidifier operation signal 72 and the current temperature what would be the commanded RH within interior 26. In so doing, humidifier rate saturation controller 74 continually operates to impose limits on controlled humidifier operation signal 72 until the temperature and humidity within interior 26 reach their steady state desired values. Humidifier rate saturation controller 74 thus advantageously avoids the formation of condensation within interior 26 by limiting controlled humidifier operation signal 72 and thus avoiding the reaching of the dew point.

A diagrammatic depiction of control apparatus 16 is presented generally in FIG. 5. Processor apparatus 32 can be understood to comprise a microcontroller 76 and a memory 78 connected therewith. Microcontroller 76 can be any of a wide variety of processors such as a microprocessor or any other type of microcontroller without limitation. Memory 78 can be any type of storage that can communicate with microcontroller 76 and thus can be in the nature of any one or more of RAM, ROM, FLASH, etc., without limitation, and can be volatile or non-volatile without limitation. Most typically, the routines that are executed on microcontroller 76 are stored, in one fashion or another, in whole or in part, in memory 78. As can be further understood from FIG. 5, the routines that are executed on microcontroller 76 comprise, in addition to those set forth elsewhere herein, specific humidity converter/lookup 64, temperature controller 54, and humidifier rate saturation controller 74, by way of example. As such, while certain functions are depicted herein as being provided by software embedded in microcontroller 76, it is noted that such functions can be provided by other devices or in other fashions without limitation.

FIG. 5 further indicates that a set of analog/digital conversion electronics 80 interface between processor apparatus 32 and other components such as temperature sensor 52, relative humidity sensor 62, and the actuators of heater 20 and humidifier 24. Analog/digital conversional electronics 80 likely will include one or more analog-to-digital converters (ADCs) and digital-to-analog converters (DACs) and other components. In this regard, it is understood that certain such components of the functions provided thereby can potentially be incorporated into microcontroller 76 without departing from the present concept.

It can be further understood from FIG. 5 that the exemplary embodiment of incubator assembly 4 depicted herein can further include some processing or operations to enable direct interface with the sensors such as temperature sensor 52 and relative humidity sensor 62, as well as with the actuators of heater 20 and humidifier 24. For instance, FIG. 5 depicts a temperature sensor signal conditioning feature 84 that performs operations as necessary on the signal that is received from temperature sensor 52. Similarly, a relative humidity sensor signal conditioning feature 86 is applied to the signal received from relative humidity sensor 62. Such signal conditioning can include, for instance, gain increases, gain scheduling, and other well known signal conditioning operations. In this regard, temperature and relative humidity sensor signal conditioning features 84 and 86 potentially can be incorporated into temperature and relative humidity sensors 52 and 62, respectively, depending upon the implementation, or can be otherwise incorporated into incubator assembly 4.

FIG. 5 further depicts a Pulse Width Modulation (PWM) power modulation feature 90 for heater 20 and a Pulse Width Modulation (PWM) power modulation feature 94 for humidifier 24. As is understood in the relevant art, heater 20 and humidifier 24 typically are operated in an ON or OFF operational mode, meaning that they typically do not directly avail themselves of proportional control. However, pulse width modulation enables rapid ON/OFF operation according to a commanded pulse width, i.e., wherein the "width" element refers to time in either the ON condition or the OFF condition, whereby an overall output or duty cycle of heater 20 and humidifier 24 can be controlled. Again, PWM power modulation features 90 and 94 potentially can be implemented directly on heater 20 and/or humidifier 24, or potentially can be otherwise implemented without departing from the present concept.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A control apparatus structured to enable control of an environment within an interior of an incubator assembly, the control apparatus comprising:

a processor apparatus upon which are executed a number of routines that comprise a user interface routine which enables the setting of a commanded temperature value and a commanded relative humidity value;

a temperature control loop comprising a temperature sensor, a temperature controller, and a heater power limit device, the temperature sensor being structured to sense a current temperature, the temperature controller being structured to generate a temperature control signal based at least in part upon the commanded temperature value and the current temperature, the heater power limit device including an element having a positive temperature coefficient of resistance configured such that an electrical resistance of the element increases with increasing temperatures to limit a maximum temperature within the interior of the incubator assembly; and a humidity control loop comprising a humidity sensor, a specific humidity converter, a humidity controller, and a humidifier rate saturation controller, the humidity sensor being structured to sense a current relative humidity, the specific humidity converter being structured to generate a current specific humidity based at least in part upon the current relative humidity and to generate a commanded specific humidity value based at least in part upon the commanded relative humidity value, the humidity controller being structured to generate a humidity control signal based at least in part upon the current specific humidity and the commanded specific humidity value, the humidifier rate saturation controller being structured to generate a humidity rate control signal based at least in part upon the humidity control signal and at least one of the current temperature and the commanded temperature value, wherein the humidity rate control signal is configured by the humidity controller to control a humidifier, wherein the temperature control loop further comprises a feed forward temperature lookup component that generates a feed forward operational heating value that is based at least in part upon at least one of the commanded temperature value and the commanded relative humidity value and that is structured to be used by a heater, and wherein the humidity control loop further comprises a feed forward humidity lookup component that generates a feed forward operational humidifying value that is based at least in part upon at least one of the commanded temperature value and the commanded relative humidity value.

2. The control apparatus of claim 1 wherein the specific humidity converter is structured to generate the current specific humidity further based at least in part upon the current temperature and to generate the commanded specific humidity value further based at least in part upon the commanded temperature value.

3. The control apparatus of claim 1 wherein the humidity rate control signal is structured to be used by the humidifier in resisting a transient relative humidity within the interior from exceeding a predetermined value.

4. A method of controlling an environment within an interior of an incubator assembly based at least in part upon a commanded temperature value and a commanded relative humidity value, the incubator assembly comprising a heater and a humidifier, the method comprising:
sensing a current temperature within the interior;
generating a temperature control signal based at least in part upon the commanded temperature value and the current temperature;
operating the heater based at least in part upon the temperature control signal;
limiting, by a heater power limit device including an element having a positive temperature coefficient of resistance configured such that an electrical resistance of the element having a positive temperature coefficient of resistance increases with increasing temperature, a maximum temperature within the interior of the incubator assembly;
sensing a current relative humidity within the interior;
generating a current specific humidity based at least in part upon the current relative humidity;
generating a commanded specific humidity value based at least in part upon the commanded relative humidity value;
generating a humidity control signal based at least in part upon the commanded specific humidity value and the current specific humidity;
generating a humidity rate control signal based at least in part upon the humidity control signal and at least one of the current temperature and the commanded temperature value;
operating the humidifier based at least in part upon the humidity rate control signal;
generating a feed forward operational heating value that is based at least in part upon at least one of the commanded temperature value and the commanded relative humidity value;
operating the heater based at least in part upon the feed forward operational heating value;
generating a feed forward operational humidifying value that is based at least in part upon at least one of the commanded temperature value and the commanded relative humidity value; and
operating the humidifier based at least in part upon the feed forward operational humidifying value.

5. The method of claim 4, further comprising:
generating the current specific humidity further based at least in part upon the current temperature; and
generating the commanded specific humidity value further based at least in part upon the commanded temperature value.

6. The method of claim 4, further comprising using the humidity rate control signal by the humidifier to resist a transient relative humidity within the interior from exceeding a predetermined value.

7. The control apparatus of claim 1, further comprising:
a first pulse width power modulator for the heater; and
a second pulse width power modulator for the humidifier, wherein the first and second pulse width power modulators are configured to, responsive to a commanded pulse width, facilitate a rapid ON or OFF operation and control at least one of a duty cycle or overall output of the heater and the humidifier.

8. The method of claim 4, further comprising:
facilitating a rapid ON or OFF operation and controlling at least one of a duty cycle or overall output of the heater and the humidifier by a first pulse width power modulator for the heater and a second pulse width power modulator for the humidifier respectively.

* * * * *